(12) United States Patent
Badillo

(10) Patent No.: US 10,358,095 B1
(45) Date of Patent: *Jul. 23, 2019

(54) CONVERTIBLE VEHICLE STORAGE RACK

(71) Applicant: Intelligent Designs 2000 Corp., Aurora, CO (US)

(72) Inventor: Paul Badillo, Littleton, CO (US)

(73) Assignee: INTELLIGENT DESIGNS 2000 CORP., Aurora, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/586,769

(22) Filed: May 4, 2017

Related U.S. Application Data

(63) Continuation of application No. 13/942,489, filed on Jul. 15, 2013, now Pat. No. 9,676,343, which is a continuation of application No. 12/861,034, filed on Aug. 23, 2010, now Pat. No. 8,496,146.

(60) Provisional application No. 61/237,177, filed on Aug. 26, 2009.

(51) Int. Cl.
*B60R 9/045* (2006.01)
*B60R 9/042* (2006.01)

(52) U.S. Cl.
CPC ............ *B60R 9/0423* (2013.01); *B60R 9/045* (2013.01)

(58) Field of Classification Search
CPC ...... B60R 9/0423; B60R 9/0426; B60R 9/045
USPC .......................................................... 224/321
See application file for complete search history.

(56) References Cited

U.S. PATENT DOCUMENTS

| | | |
|---|---|---|
| D30,369 S | 3/1899 | Mandt |
| D33,754 S | 12/1900 | Hien |
| 704,436 A | 7/1902 | Cluff |
| 744,113 A | 11/1903 | Rye |
| 1,564,776 A | 12/1925 | Green |
| 1,606,954 A | 11/1926 | Moen et al. |
| 2,387,779 A | 10/1945 | Strauss |
| 2,492,841 A | 12/1949 | Burkey |
| 2,521,815 A | 9/1950 | Will |
| 2,663,472 A | 12/1953 | Belgau |
| 2,784,888 A | 3/1957 | Lecanu-Deschamps |
| 2,800,264 A | 7/1957 | McFadyen |
| 2,967,635 A | 1/1961 | Barnett |
| 3,158,301 A | 11/1964 | Hedgepeth |
| 3,215,323 A | 11/1965 | Bonitt |
| 3,260,929 A | 7/1966 | Hedgepeth |

(Continued)

OTHER PUBLICATIONS

Advertisement: 921—Daves Rack, Olympic 4×4 Products for over 60 years, available at http://olympic4x4products.com/utility-racks/ 921-daves-rack, printed Jan. 14, 2011, 3 pages.*

(Continued)

*Primary Examiner* — Derek J Battisti
(74) *Attorney, Agent, or Firm* — Sheridan Ross PC

(57) ABSTRACT

A convertible roof rack is provided that is generally comprised of a light bar and a roof rack that is spaced from the roof of a vehicle. The roof rack is also rotatably interconnected to a support structure associated with the rear of the vehicle such that it is capable of moving from a first position of use adjacent to the roof to a second position of use away from the roof where the light bar remains interconnected to the vehicle adjacent to the windshield. As such, electrical connections associated with the light bar remain intact when the roof rack is rotated away from the roof.

8 Claims, 19 Drawing Sheets

(56) References Cited

U.S. PATENT DOCUMENTS

| | | | |
|---|---|---|---|
| 3,330,454 A | 7/1967 | Bott | |
| 3,531,006 A | 9/1970 | Farchmin | |
| D223,753 S | 6/1972 | Seals | |
| 3,762,587 A * | 10/1973 | Longee, Sr. | B60P 3/1016 414/462 |
| 3,765,713 A | 10/1973 | Suitt | |
| 3,902,642 A | 9/1975 | McNeece | |
| 3,905,499 A | 9/1975 | Speidel | |
| D243,447 S | 2/1977 | Smith, III et al. | |
| 4,240,571 A * | 12/1980 | Ernst | B60R 9/042 224/310 |
| 4,249,683 A * | 2/1981 | Park | B60R 3/005 182/129 |
| 4,336,897 A | 6/1982 | Luck | |
| 4,350,471 A | 9/1982 | Lehmann | |
| 4,817,834 A | 4/1989 | Weiler | |
| 4,948,024 A | 8/1990 | Warner et al. | |
| 4,995,538 A | 2/1991 | Marengo | |
| D324,664 S | 3/1992 | Burnette | |
| 5,171,083 A | 12/1992 | Rich | |
| 5,320,061 A | 6/1994 | Laughlin et al. | |
| 5,381,939 A | 1/1995 | Tippets | |
| D359,134 S | 6/1995 | Toews | |
| 5,560,525 A | 10/1996 | Grohmann et al. | |
| D406,557 S | 3/1999 | Bentley | |
| D413,562 S | 9/1999 | Van Dusen et al. | |
| 6,003,633 A | 12/1999 | Rolson | |
| 6,015,074 A | 1/2000 | Snavely et al. | |
| D422,553 S | 4/2000 | VonDuyke | |
| 6,116,378 A | 9/2000 | Barrow | |
| D434,364 S | 11/2000 | Bauer et al. | |
| 6,152,339 A * | 11/2000 | Kreisler | B60R 9/00 224/309 |
| D434,718 S | 12/2000 | Kreisler | |
| D435,510 S | 12/2000 | Quidort | |
| 6,179,180 B1 | 1/2001 | Walker et al. | |
| D442,289 S * | 5/2001 | Ziaylek, Jr. | D25/64 |
| 6,308,874 B1 * | 10/2001 | Kim | B60R 9/042 224/309 |
| 6,425,508 B1 | 7/2002 | Cole et al. | |
| 6,428,263 B1 * | 8/2002 | Schellens | B60R 9/042 224/310 |
| D463,358 S | 9/2002 | Thomas | |
| D470,451 S | 2/2003 | Bushart et al. | |
| 6,561,397 B1 | 5/2003 | Bauer et al. | |
| 6,581,813 B2 | 6/2003 | Bove et al. | |
| D477,562 S | 7/2003 | McCoy et al. | |
| 6,604,606 B1 | 8/2003 | McDougal et al. | |
| D479,884 S | 9/2003 | Berryman | |
| D481,003 S | 10/2003 | Bauer et al. | |
| 6,715,652 B2 * | 4/2004 | Kmita | B60R 9/042 224/310 |
| D490,163 S | 5/2004 | Thurston | |
| 6,739,349 B2 | 5/2004 | Kastenschmidt et al. | |
| 6,755,332 B2 * | 6/2004 | Crane | B60R 9/00 224/321 |
| 6,772,928 B2 * | 8/2004 | Ford | B60R 9/06 224/310 |
| D508,015 S | 8/2005 | Badillo | |
| D512,783 S | 12/2005 | Badillo | |
| D520,938 S | 5/2006 | Badillo | |
| 7,055,454 B1 | 6/2006 | Whiting et al. | |
| D537,404 S | 2/2007 | Bauer et al. | |
| 7,226,226 B2 | 6/2007 | Troman | |
| 7,226,266 B2 | 6/2007 | Henderson et al. | |
| 7,249,927 B2 | 7/2007 | Wooten et al. | |
| D549,838 S | 8/2007 | Badillo | |
| D558,123 S | 12/2007 | Murillo | |
| D564,419 S | 3/2008 | Clontz | |
| D578,952 S | 10/2008 | Badillo | |
| D603,321 S | 11/2009 | Kramer | |
| D621,328 S | 8/2010 | Sistare et al. | |
| D624,005 S | 9/2010 | Winner et al. | |
| D638,333 S | 5/2011 | Freeman | |
| D650,316 S | 12/2011 | Pirolo et al. | |
| 8,496,146 B2 | 7/2013 | Badillo | |
| D765,577 S | 9/2016 | Kmita et al. | |
| D772,783 S | 11/2016 | Schleef | |
| 9,676,343 B2 | 6/2017 | Badillo | |
| D815,012 S | 4/2018 | Badillo | |
| D825,924 S | 8/2018 | Tuang | |
| 2005/0082326 A1 | 4/2005 | Badillo | |
| 2005/0092796 A1 | 5/2005 | Essig | |
| 2005/0095102 A1 * | 5/2005 | Watson | B60R 9/042 414/462 |
| 2011/0101056 A1 | 5/2011 | Barkey | |
| 2017/0203697 A1 | 7/2017 | Badillo | |

OTHER PUBLICATIONS

U.S. Appl. No. 29/535,865, filed Aug. 11, 2015, Badillo.
U.S. Appl. No. 29/535,957, filed Aug. 12, 2015, Badillo.
Official Action for U.S. Appl. No. 29/535,865, dated Nov. 3, 2017 10 pages.
Notice of Allowance for U.S. Appl. No. 29/612,929 dated Sep. 27, 2018, 7 pages.
Notice of Allowance for U.S. Appl. No. 29/612,927 dated Sep. 27, 2018, 7 pages.
Notice of Allowance for U.S. Appl. No. 29/612,924 dated Sep. 27, 2018, 7 pages.
Notice of Allowance for U.S. Appl. No. 29/612,930, dated Sep. 27, 2018, 7 pages.
U.S. Appl. No. 29/612,924, filed Aug. 4, 2017, Badillo.
U.S. Appl. No. 29/612,927, filed Aug. 4, 2017, Badillo.
U.S. Appl. No. 29/612,929, filed Aug. 4, 2017, Badillo.
U.S. Appl. No. 29/612,930, filed Aug. 4, 2017, Badillo.
U.S. Appl. No. 29/640,814, filed Mar. 16, 2018, Badillo.
Official Action for U.S. Appl. No. 29/535,865, dated Jun. 28, 2018, 9 pages.
Official Action for U.S. Appl. No. 15/344,244, dated Jun. 21, 2018, 11 pages.

* cited by examiner

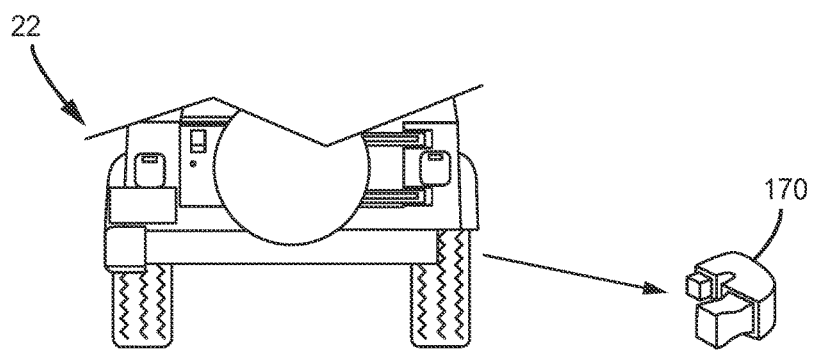
FIG. 24
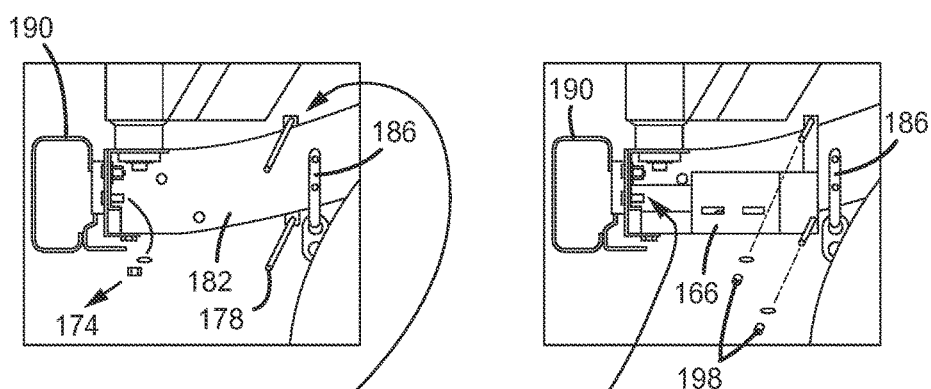
FIG. 25
FIG. 26
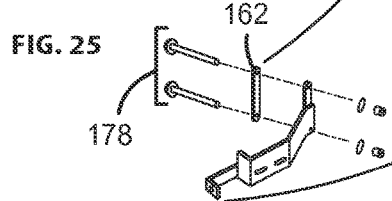

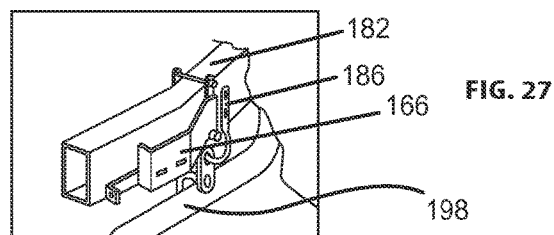
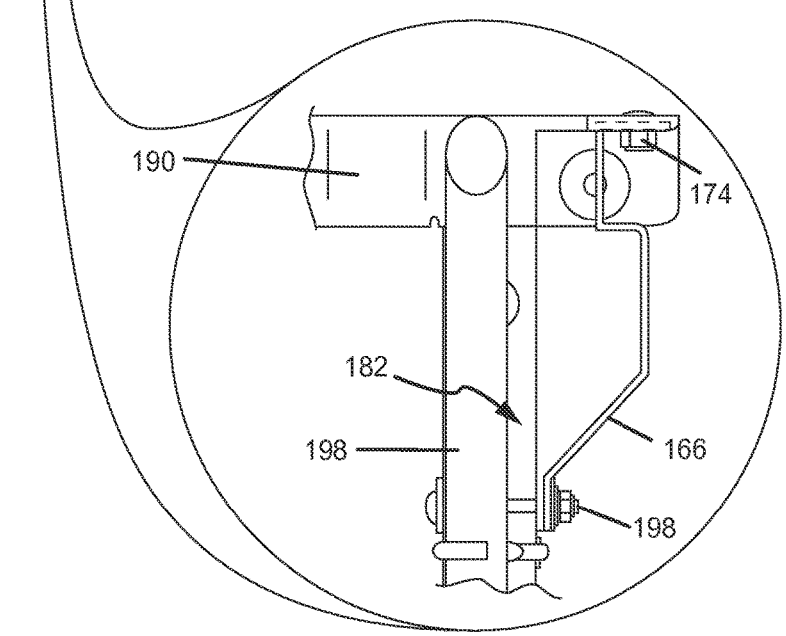
FIG. 28

CONVERTIBLE VEHICLE STORAGE RACK

CROSS REFERENCE TO RELATED APPLICATIONS

This patent application is a continuation of U.S. patent application Ser. No. 13/942,489, filed Jul. 15, 2013, which is a continuation of U.S. patent application Ser. No. 12/861,034, filed Aug. 23, 2010, now U.S. Pat. No. 8,496,146, which claims the benefit of U.S. Provisional Patent Application Ser. No. 61/237,177, filed Aug. 26, 2009, each of which is incorporated by reference in its entirety herein.

This application is also related to abandoned U.S. Patent Application Publication No. 2005/0082326, filed Sep. 24, 2004, U.S. Pat. No. D578,952, filed Feb. 20, 2008, U.S. Pat. No. D512,783, filed Jun. 4, 2003, and U.S. Pat. No. D508,015, filed Mar. 17, 2003, the entire disclosures of which are incorporated by reference herein.

FIELD OF THE INVENTION

Embodiments of the present invention are generally related to storage racks for interconnection to a motor vehicle. More specifically, one embodiment of the present invention is a vehicle storage rack with lighting elements associated with a fixed portion that also includes a selectively movable portion that is capable of moving from a first position of use to a second position of use without having to disconnect associated wiring.

BACKGROUND OF THE INVENTION

Storage racks are often installed on vehicles to permit carrying additional items that will not fit within the vehicle or are not desirable to carry in the vehicle. Storage racks also often accommodate a variety of lights, such as fog lights. It is sometimes necessary to remove the storage rack to make modifications to the vehicle. For example, the storage rack of some vehicles must be removed in order to gain access to various roof elements for removal or replacement. That is, in order to facilitate changing the exterior of a vehicle, the roof rack must be removed. This is often a cumbersome and difficult task wherein the aforementioned lights and associated wiring must be removed. To complicate this task, roof racks are often heavy, and may be difficult and/or dangerous to remove and replace by a lone individual.

Another drawback of the roof racks of the prior art is that they are often hard-mounted to the vehicle, which requires the drilling of additional holes into the vehicle. If drilled by the end user, these holes are often located incorrectly, thereby requiring re-drilling, and possibly, decreasing the resale value of the vehicle. Thus it would be desirable to provide a storage rack that is easily interconnected to a vehicle without requiring permanent modifications to the vehicle.

Thus it is a long felt need to provide a roof storage rack that is easily installed on a vehicle and that is easy to remove, completely or partially, from the vehicle so that the vehicle may be accessed or modified. It is also desirable to provide a storage rack that allows for lights and other electrical components associated with the vehicle storage rack to remain interconnected to the power source of the vehicle. The following disclosure describes an improved vehicle storage rack that allows front mounted lights to be maintained with the rack when another portion of the rack is moved to provide access to various areas of the vehicle.

SUMMARY OF THE INVENTION

It is one aspect of embodiments of the present invention to provide a roof storage rack ("roof rack") for installation on a vehicle. The roof rack of one embodiment of the present invention includes a light bar for accommodating at least one light that is interconnected to the vehicle adjacent to the windshield and selectively interconnected to the roof rack. The roof rack of this embodiment of the present invention is also interconnected to a support bar that is rotatably interconnected to members that are associated with a rear portion of the vehicle. One advantage of embodiments of the present invention is that the roof rack is installed by using existing holes and/or standard hardware of the vehicle so that no modifications need to be made to the vehicle.

It is another aspect of one embodiment of the present invention to provide a roof rack that includes a light bar that remains interconnected to the vehicle when the roof rack is moved therefrom. More specifically, one embodiment of the present invention employs a light bar that is firmly associated with a windshield frame of a vehicle. As one skilled in the art will appreciate, often the lights associated with a light bar, such as fog lights, include a plurality of wires that are interconnected to the power source of the vehicle. These wires are often fed through the tubular structure of the light bar and interconnected to the battery of the vehicle. In one embodiment of the present invention, the light bar remains fixed to the vehicle roof and/or windshield frame such that removal of the remainder of the roof rack from the roof does not require disconnection of the lights.

It is another aspect of one embodiment of the present invention to provide a roof rack that is relatively easy to install. More specifically, one advantage of embodiments of the present invention is that no additional holes need to be drilled into the vehicle for installation. That is, embodiments of the present invention utilize holes and/or fasteners of the vehicle frame and/or body. Further, one embodiment of the present invention uses both the vehicle frame and body to provide a stable roof rack that helps prevent roof rack sway. A plurality of wear plates may be glued or otherwise interconnected to the vehicle to prevent vehicle marring or wear from portions of the roof rack that are positioned adjacent to the vehicle body. As such, the roof rack may be easily installed and removed without damaging the vehicle, which improves the potential resale value thereof.

It is another aspect of one embodiment of the present invention to provide a roof rack that may be installed and operated by a single individual. More specifically, the roof rack may be disassembled into easy to handle pieces that facilitate integration onto the vehicle. In operation, the roof rack is designed to rotate away from the roof and the light bar and then be supported by a lanyard, rope, tether or bungee that interconnects the roof rack to the light bar. Roof racks of embodiments of the present invention are thus able to achieve the contemplated rotation under the force and guidance of one individual, which will be described in further detail below.

It is yet another aspect of the present invention to provide a roof rack that is adapted to receive other items, such as a ladder, a sun roof insert, and other equipment, as described in some of the above-identified references.

It is another aspect of the present invention to provide a convertible roof rack adapted for use with a vehicle comprising: a light bar adapted to interconnect to a vehicle adjacent a windshield thereof; a first support tower and a second support tower, each interconnected to the frame of the vehicle adjacent to the rear thereof; a support bar having a first leg operably interconnected to the first support tower and a second leg operably interconnected to the second support tower; a roof rack interconnected on one end to the support bar between the first leg and the second leg, the roof rack being selectively interconnected on another end to the light bar; and wherein the roof rack is capable of movement from a first position of use adjacent to the roof of the vehicle to a second position of use away from the roof of the vehicle while the light bar remains interconnected to the vehicle.

It is still yet another aspect of the present invention to provide a convertible roof rack adapted for use with a vehicle comprising: a light bar adapted to interconnect to a vehicle adjacent to a windshield thereof; a means for supporting interconnected to the vehicle; a roof rack rotatably interconnected on one end to the means for supporting, the roof rack being selectively interconnected on another end to the light bar; wherein the roof rack is capable of movement from a first position of use adjacent to the roof of the vehicle to a second position of use away from the roof of the vehicle while the means for supporting remains associated with the vehicle; and wherein the light bar remains fixed to the vehicle regardless of the position of the roof rack.

It is yet another aspect of the present invention to provide a method of using a convertible roof rack adapted for use with a vehicle comprising; interconnecting a light bar to a vehicle adjacent to a windshield thereof using existing vehicle hardware; interconnecting a first support member and a second support member to the frame of the vehicle; interconnecting the support bar to the first support member and the second support member; interconnecting the roof rack to a support bar; moving the roof rack to a first position of use by rotating the support bar towards a roof of the vehicle; interconnecting the roof rack to the light bar; and moving the roof rack to a second position of use by rotating the support bar away from the roof of the vehicle while maintaining the position of the light bar.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 24 is a rear elevation view of a vehicle for receiving one embodiment of the present invention shown with a rear bumper end cap removed;

FIG. 25 is a detailed view of FIG. 24 showing the interconnection of the clamp plate to the vehicle's frame;

FIG. 26 is a detailed view of FIG. 24 showing the interconnection of a frame extension plate;

FIG. 27 is a partial perspective view of the frame extension plate interconnected to a vehicle;

FIG. 28 is a bottom view of FIG. 27 showing the frame extension plate;

Figure 1:
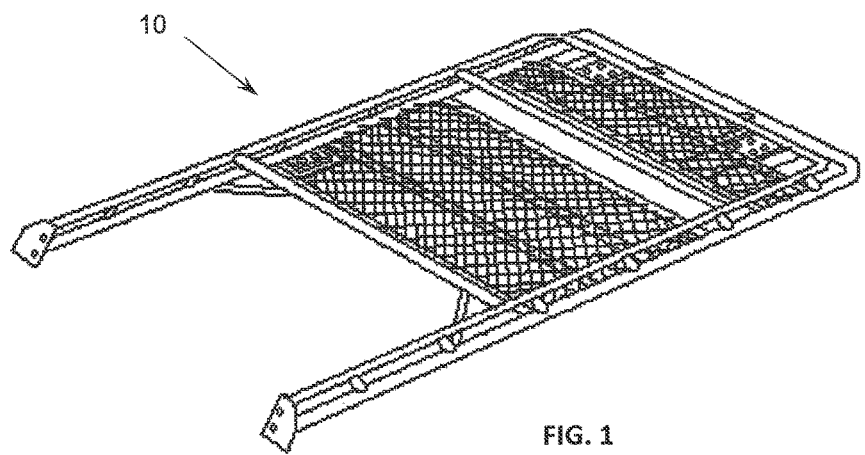
FIG. 1 is a perspective view of a roof rack of one embodiment of the present invention.
Figure 2:
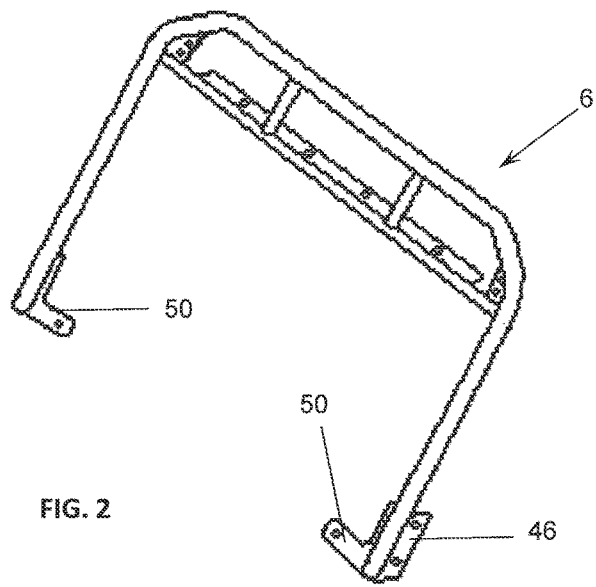
FIG. 2 is a perspective view of a light bar of one embodiment of the present invention.

To assist in the understanding of one embodiment of the present invention the following list of components and associated numbering found in the drawings is provided herein:

Component
2 Roof rack system
6 Light bar
10 Roof rack
14 Support bar

18 Support tower
22 Vehicle
26 Roof
30 Windshield
34 Windshield frame
38 Light
42 Screw
46 Outer bracket
50 Inner bracket
54 Inner body
58 Outer body
62 Lip
66 Clamp portion
70 Pinch plate
74 Screw
78 Isolator
82 Wear plate
86 Support plate
90 Stud
94 Frame
98 Collar
102 Bolt
106 Washer
110 Shoulder washer
114 Flange
118 Bracket
122 Bolt
126 Isolator
130 Washer
134 Jam nut
138 Bolts
142 Nut
146 Light bar plate
150 Roof rack plate
154 Ladder
158 Bracket
162 Clamp plate
166 Frame extension plate
170 Rear bumper end cap
174 Lower nut and washer
178 Carriage bolts
182 Rear frame
186 Tail pipe support
190 Rear bumper
194 Bumper bolt
198 Tail pipe
202 Inner body flange
206 Inner body sheet metal wall
210 Sunroof Insert
212 Lower edge portion
214 Ear
218 Lower roof rack tube
222 Clamp
226 Bolt
230 Knob
234 Upper roof rack tube It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-19, a convertible roof rack system 2 of one embodiment of the present invention is shown. More specifically, the convertible roof rack system 2 is comprised of a light bar 6, a roof rack 10, a support bar 14, and support towers 18 that are all operably interconnected to a vehicle 22. The roof rack 10 is placed above the roof 26 of the vehicle 22 and adjacent to a rear end and windshield 30 thereof. The support bars 14 are rotatably interconnected to the support towers 18 and are thus able to move from a first position of use adjacent to the roof 26 to a second position of use away from the vehicle 22. A front end of the roof rack 10 is selectively interconnected to the light bar 6, which is firmly interconnected on the windshield frame 34 adjacent to the windshield 30 of the vehicle 22. Thus, the roof rack 10 may be rotated away from the roof 26 of the vehicle 22 while the light bar 6 remains in place.

Figure 7:
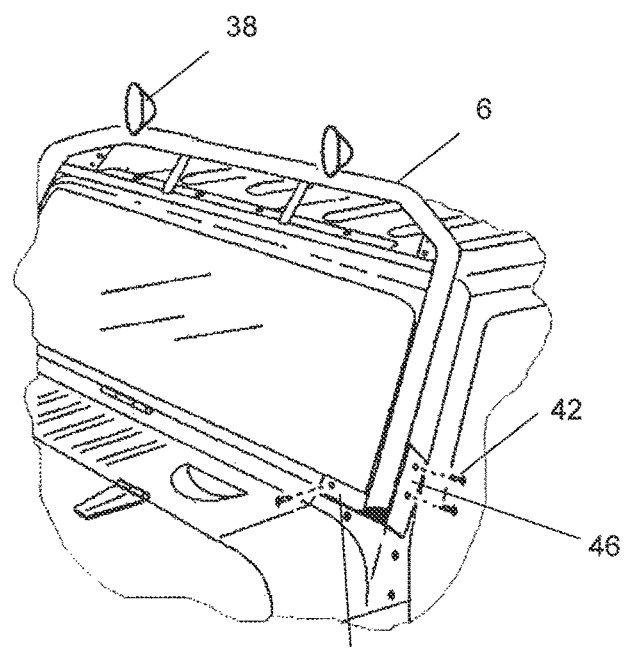
FIG. 7 is a perspective view of the vehicle shown in FIG. 6 with interconnected light bar.
Figure 8:
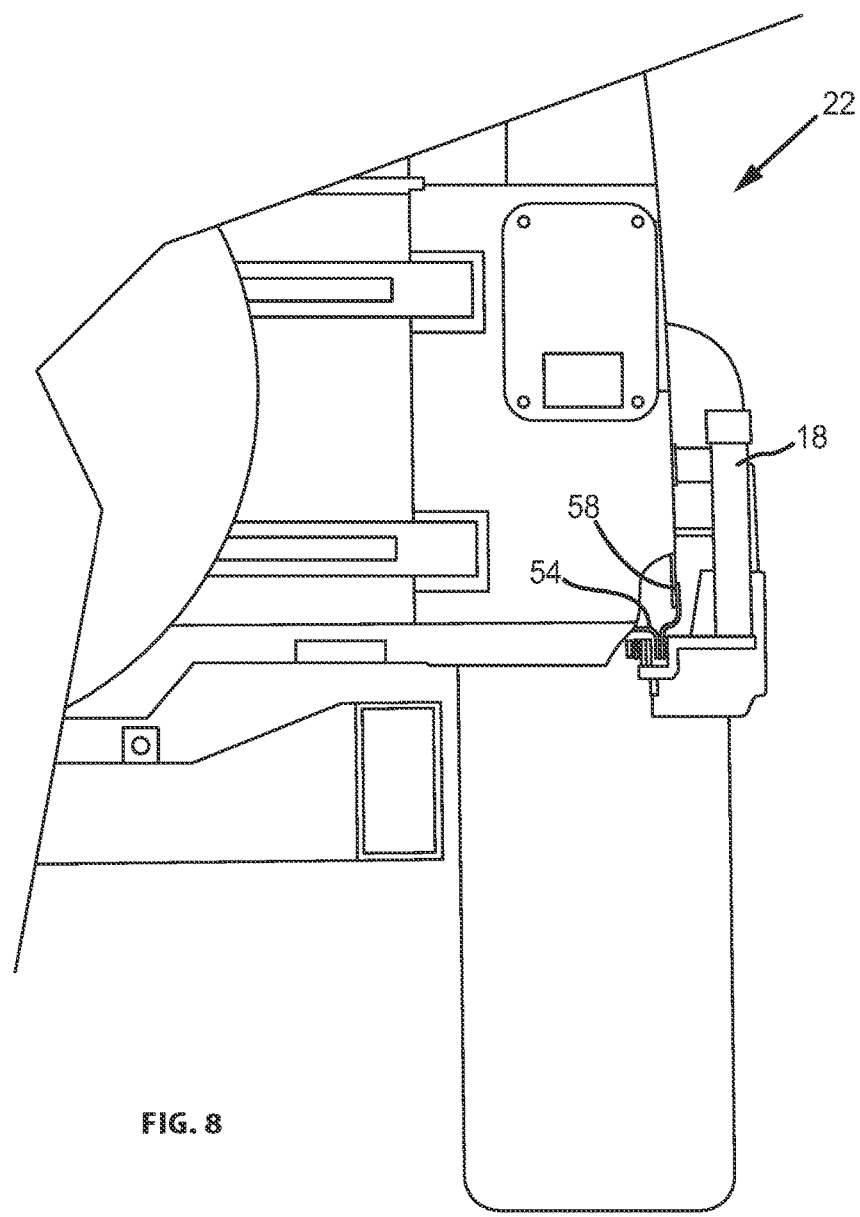
FIG. 8 is a rear elevation view of a vehicle of one embodiment of the present invention shown with interconnected support tower.
Figure 9:
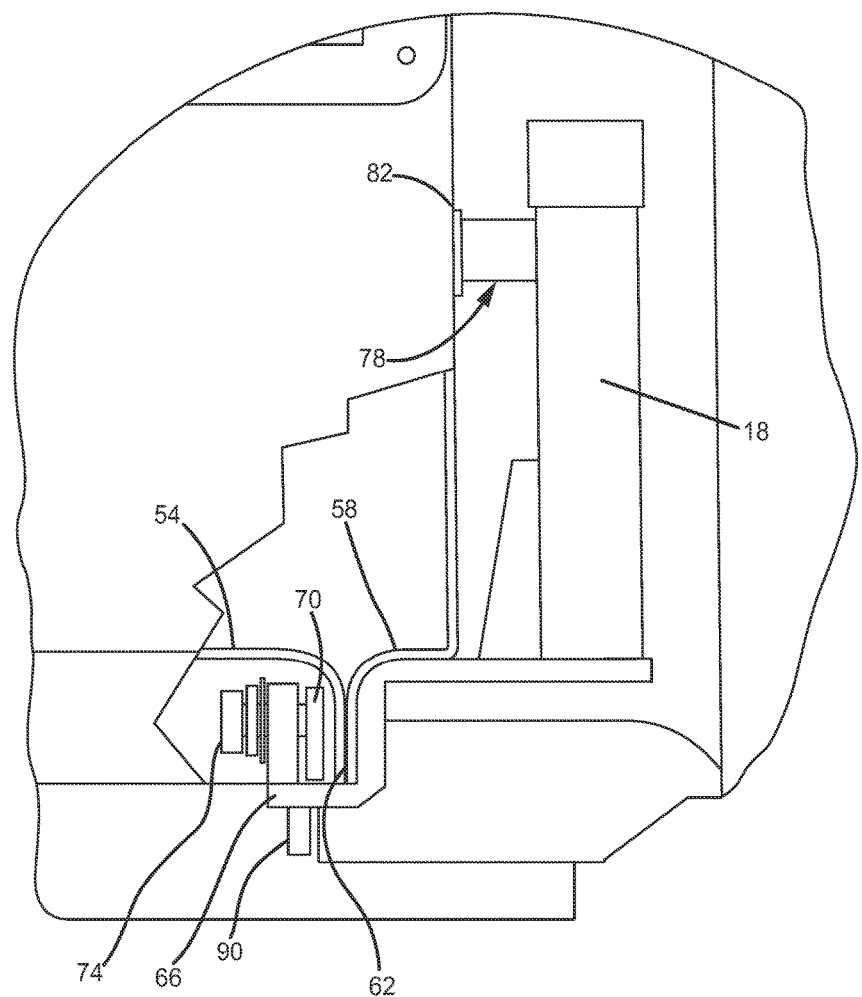
FIG. 9 is a detailed view of FIG. 8 showing the interconnection of the support tower.
Figure 10:
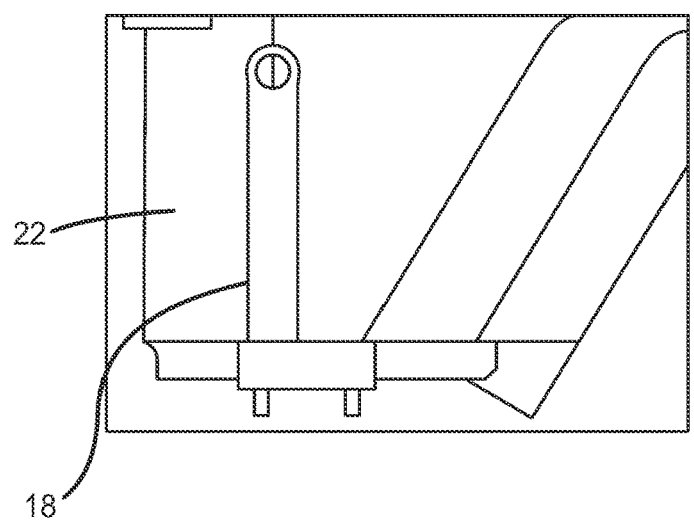
FIG. 10 is a side elevation view of FIG. 9.

Referring now to FIGS. 2, 6, 7, and 20-23 the light bar 6 of one embodiment of the present invention is shown. In FIG. 7, lights 38 are shown interconnected to the light bar 6 in the remaining other views of the application, the lights are omitted for clarity. One skilled in the art will appreciate that any number of lights 38 or other electronic componentry, such as speakers, neon lights, signs, etc., may be associated with the light bar 6 in any fashion without departing from the scope of the invention. The light bar 6 is adapted to be interconnected to lights 38 of various sizes and shapes. For example, in FIG. 22, lights 38 are rectangular and in FIG. 23, lights 38 are circular.

The light bar 6 is preferably a tubular structure that is interconnected to the windshield frame 34 that is adjacent to the windshield 30 of the vehicle 22. Some vehicles 22 include a plurality of screws 42 for roof racks that are associated with the windshield frame 34 and are located adjacent to the windshield 30. In operation, these screws 42 are removed and replaced or reused to interconnect an outer bracket 46 and an inner bracket 50 of the light bar 6 to the windshield frame 34. Thereafter, the wires associated with electronic components associated with the light bar 6 are then interconnected to the power source of the vehicle 22. In one embodiment, an electrical connector is in association with the light bar and the electrical connector is in electrical communication with the power source of the vehicle 22.

Referring now to FIGS. 4 and 8-11, the interconnection of the support towers 18 to the vehicle is shown. Vehicles 22 in which embodiments of the present invention are preferably interconnected include an inner body 54 and an outer body 58 that are interconnected to form a downwardly extending lip 62. The support tower 18 of embodiments of the present invention includes a clamp portion 66 that includes a pinch plate 70 and is associated with a screw 74. In operation, tightening of the screw 74 sandwiches the lip 62 between the clamp portion 66 of the support tower 18 and the pinch plate 70 to hold the support tower 18 in place. It should be understood, however, that in some instances drilling of holes may be required to interconnect the support tower or other components described herein. The support tower 18 may also include a load isolating member, i.e. an isolator 78, which is interconnected between the support tower 18 and a wear plate 82 that is adhered to the vehicle 22. In operation, vibrational loads associated with a support tower 18 are transferred through the isolator 78 to the wear plate 82, thereby protecting the vehicle 22 from any loads or abrasions. Preferably, the isolator 78 of one embodiment is made of nylon. One of skill in the art will appreciate that the support tower may be omitted wherein the support bar is selectively interconnected to a base plate 84 that is associated with the clamp portion 66.

Figure 5:
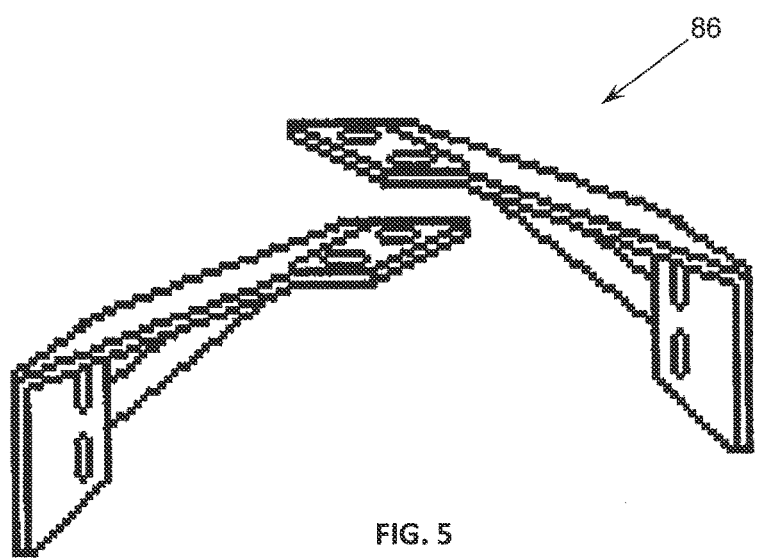
FIG. 5 is a perspective view of support plates of one embodiment of the present invention.
Figure 6:
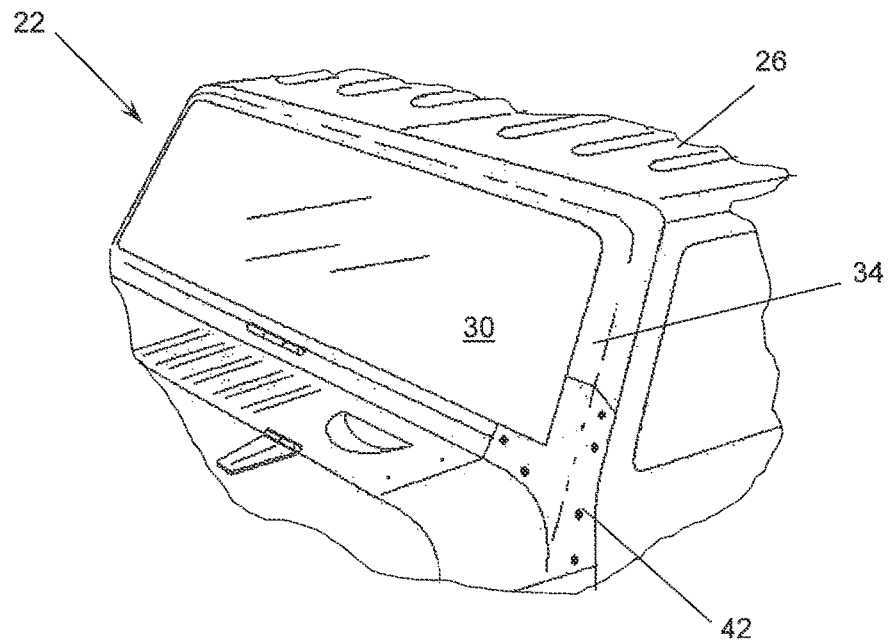
FIG. 6 is a partial perspective view of a vehicle of one embodiment of the present invention.
Figure 11:
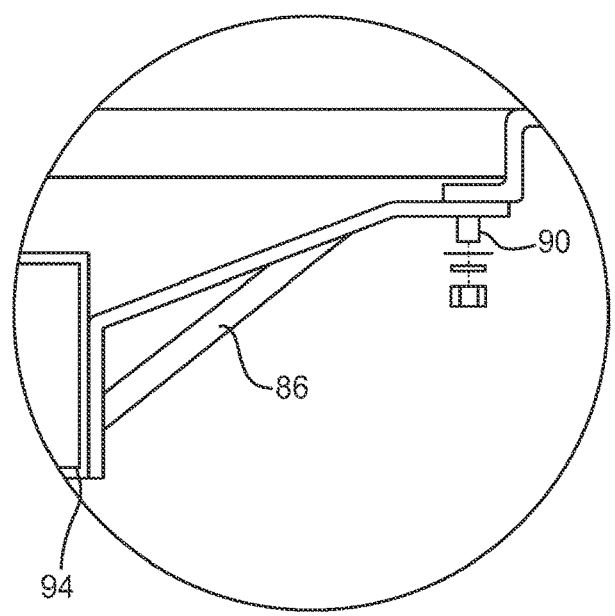
FIG. 11 is a detailed view similar to that of FIG. 9 wherein a support plate is additionally interconnected to the support tower.

Referring now to FIGS. 5 and 11, in order to further strengthen the interconnection between the support tower 18 and the vehicle 22, a support plate 86 may be utilized. The support plate 86 interconnects to a stud 90 of the support tower 18 on one end and to a frame 94 of the vehicle 22 on the other end. It is contemplated that the interconnection with the frame 94 is achieved by utilizing holes and fasteners normally used to interconnect the bumper (not shown) to the vehicle 22. That is, the bumpers of many vehicles are interconnected to the frame by a plurality of bolts and it is contemplated that those bolts be removed to interconnect the support plates 86 to the frame 94. Thereafter, a bracket (not shown) would be utilized that would share those bolts and provide a location for the re-interconnection of the bumper to the frame 94. The support plate 86 thus allows bending loads that would force the support tower away from the vehicle to be transferred directly to the frame 94. One of skill in the art will appreciate that the towers 18 may be omitted where the support bars 14 are alternatively interconnected to the support plates 86.

Figure 3:
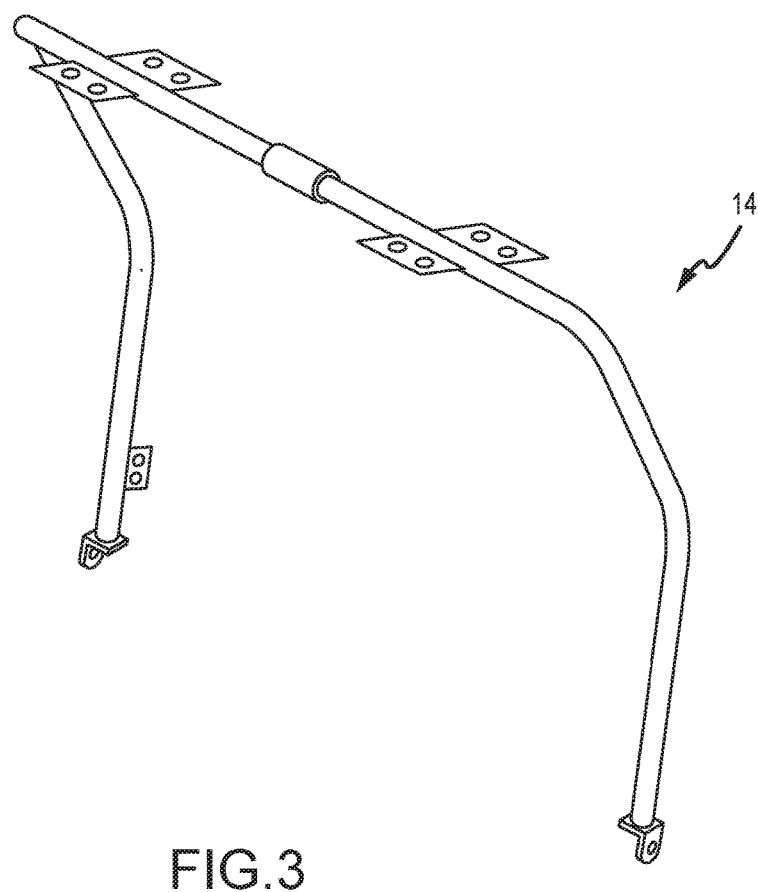
FIG. 3 is a perspective view of a support bar of one embodiment of the present invention.
Figure 4:
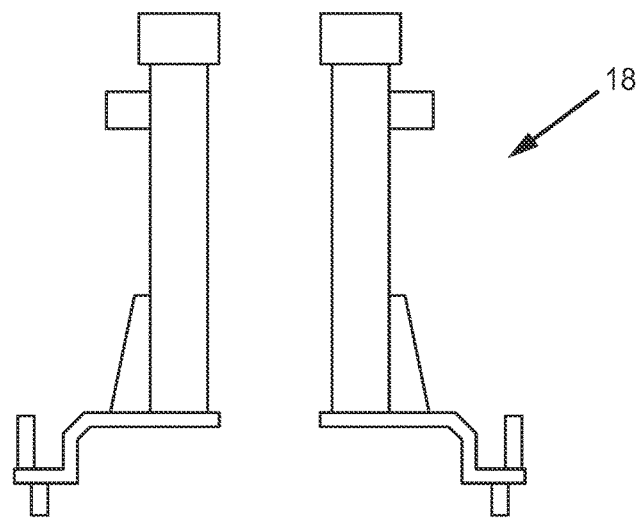
FIG. 4 is a front elevation view of support towers of one embodiment of the present invention.
Figure 12:
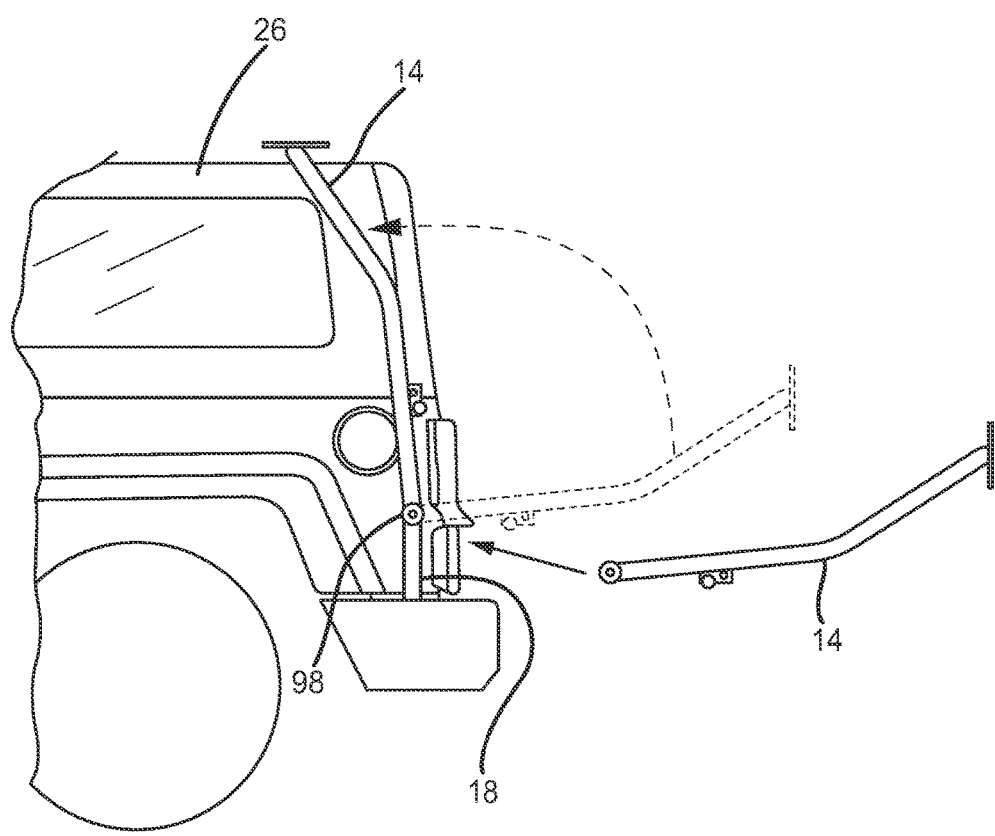
FIG. 12 is a side elevation view of the vehicle and support bar shown in two positions of use.
Figure 13:
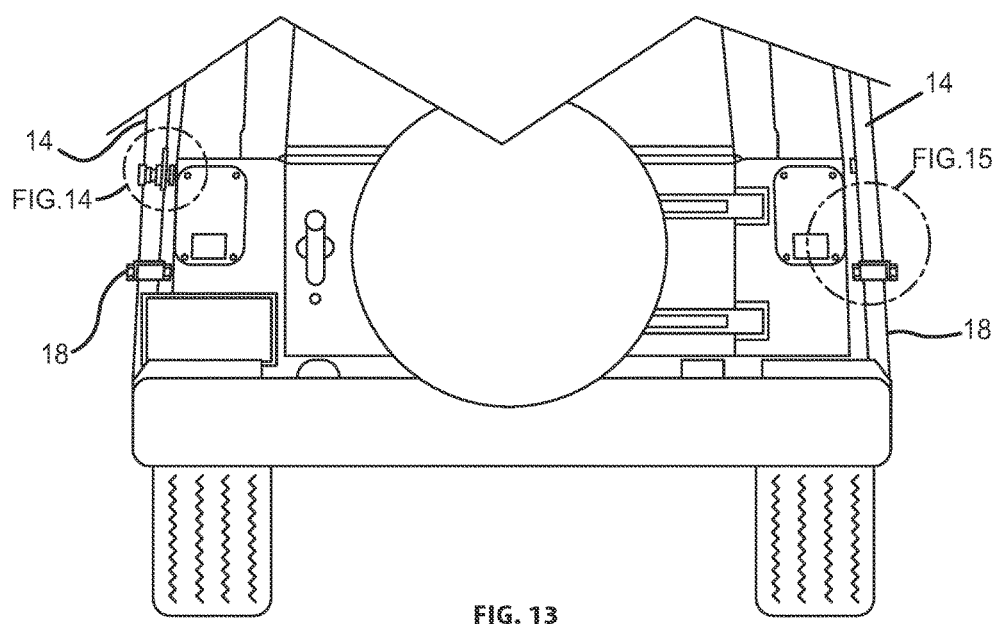
FIG. 13 is a rear elevation view of the vehicle showing the interconnected support bar.
Figure 15:
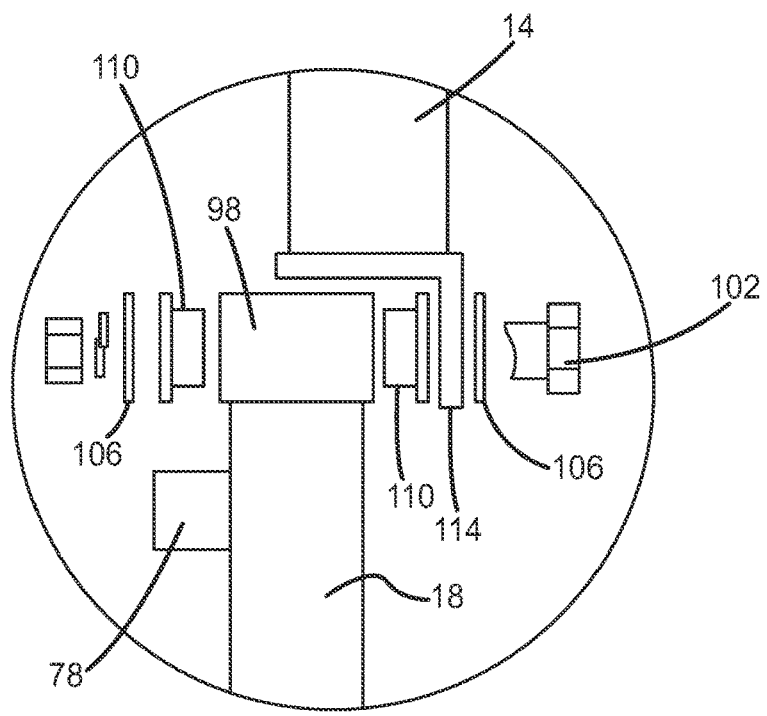
FIG. 15 is a detailed view of FIG. 13.

Referring now to FIGS. 3, 12 and 15, the support bar 14 is shown that supports the rear of the vehicle rack 10 and is rotatably interconnected to the support tower 18. Preferably, the support tower 18 includes a collar 98 that receives a portion of the support bar 14 and is held in place by a bolt 102 that is associated with a washer 106 with a plurality of shoulder washers 110 therebetween. One skilled in the art will appreciate that other interconnection methods, such as a clevis, may be employed without departing from the scope of the invention. The bolt 102 interconnects a flange 114 of the support bar 14 with the bolt 102 resting within the collar 98 of the support flange 114. Thus, the support bar 14 is capable of moving from a first position of use adjacent to the roof 26 of the vehicle 22 to a second position of use away therefrom.

Figure 14:
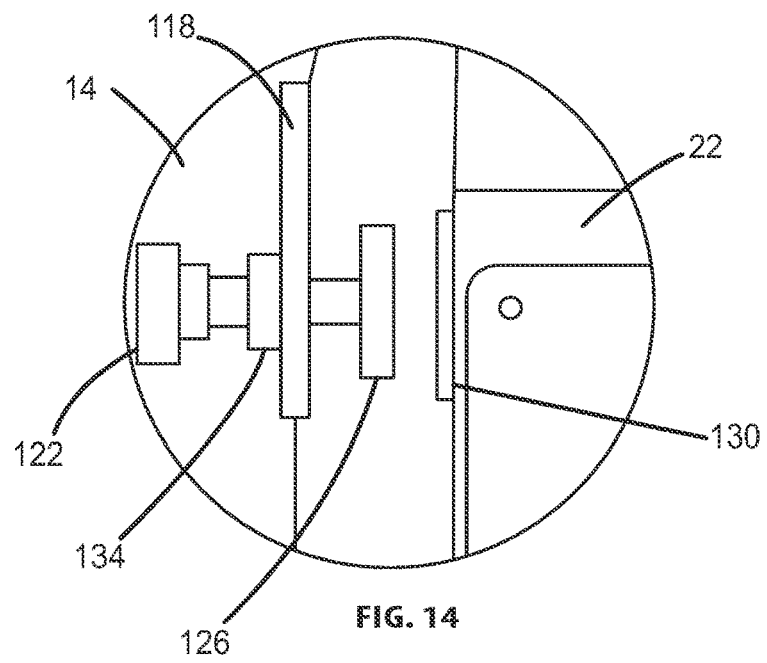
FIG. 14 is a detailed view of FIG. 13.

Referring to FIG. 14, in order to further reduce sway of the roof rack, the support bar 14 may also include a bracket 118 that receives a bolt 122 with an interconnected isolator 126. In one embodiment of the present invention, the isolator 126 is made of rubber and interacts with a washer 130 or wear plate that is interconnected to the vehicle 22 with adhesive. A jam nut 134 may also be used to ensure that the isolator 126 remains firmly associated with the washer 130. The isolator 126 may be interconnected anywhere along the length of the support bar 14 so long contact is made with the vehicle or associated wear plate.

Figure 16:
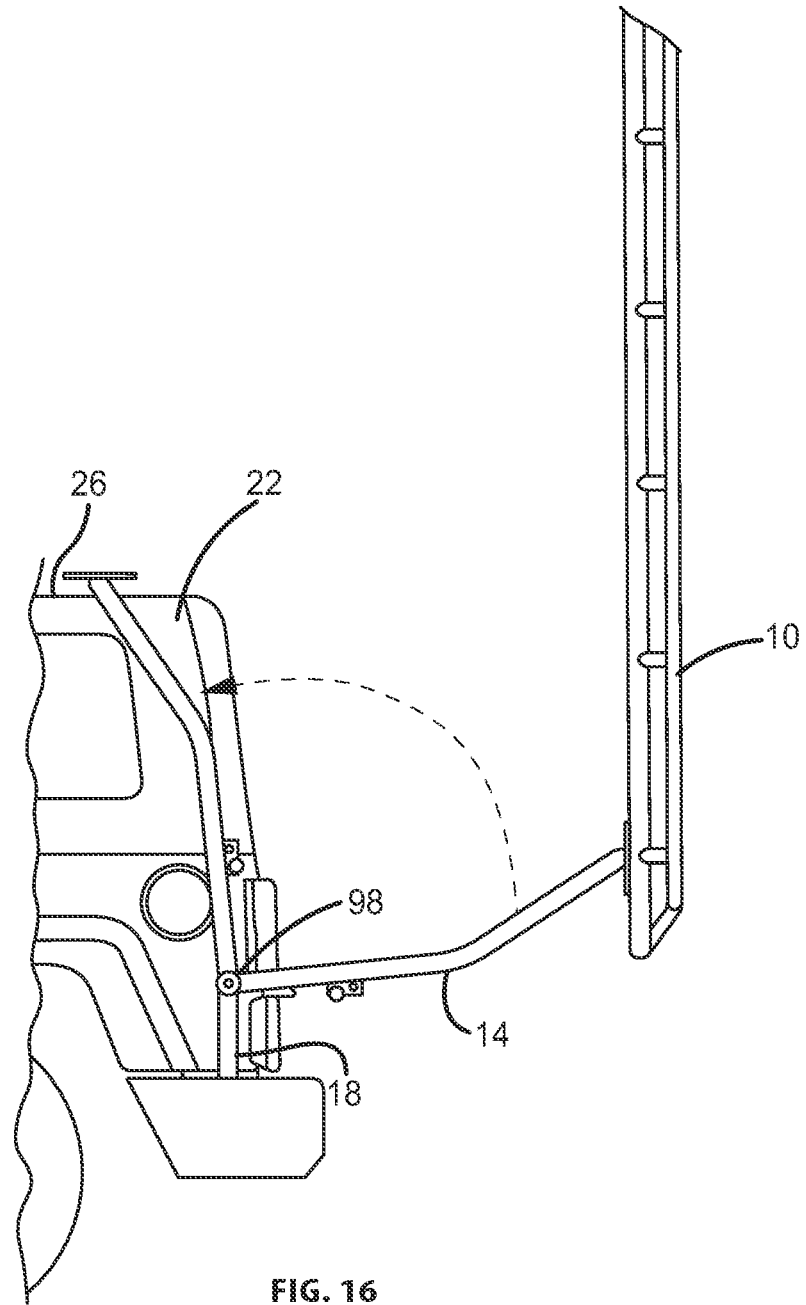
FIG. 16 is a side elevation view of a vehicle with interconnected support bar and vehicle rack.
Figure 17:
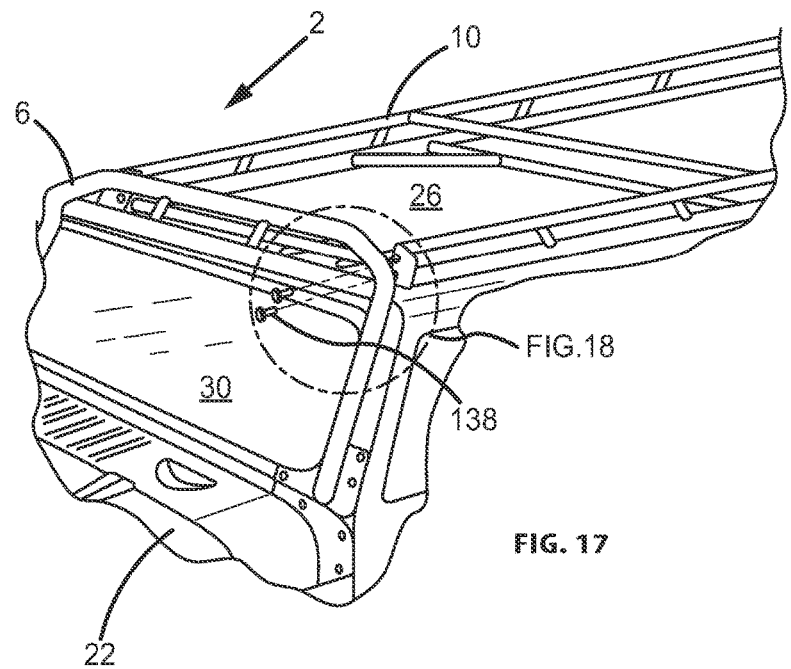
FIG. 17 is a partial perspective view of the vehicle rack interconnected to the light bar.
Figure 18:
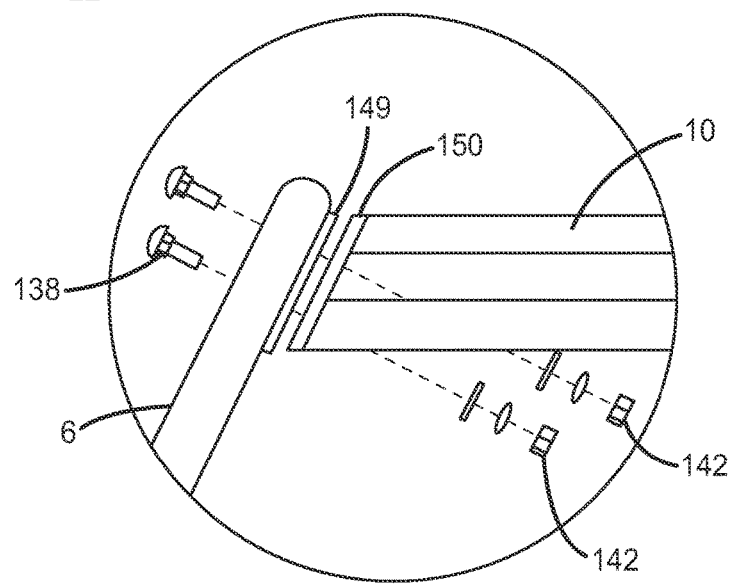
FIG. 18 is a front detail view of FIG. 17.

Referring now to FIG. 16-18, the operation of one embodiment of the present invention is shown. In operation, the roof rack 10 is interconnected to the support bar 14, which is rotatably interconnected to the support towers 18. In order to move the roof rack 10 to the first position of use adjacent to the roof 26, one would push the support bar 18 and rotate the roof rack 10 towards the roof 26 of the vehicle 22. It is important to note that the roof rack 10 in the second position of use may be supported by a piece of wood or other items associated with the ground. More preferably, however, a lanyard (not shown) is interconnected to the light bar 6 on one end and to the roof rack 10 on the other end, to prevent over rotation of the roof rack 10 past its second position of use. After the roof rack 10 is placed in the first position of use, as succinctly shown in FIG. 17, the bolts of FIG. 14 are tightened to place the isolators in contact with the washers, thereby substantially reducing sway of the roof rack 10.

Finally, the roof rack is interconnected to the light bar 6 as shown in FIGS. 17 and 18 by way of a plurality of bolts 138 and nuts 142 that are used to interconnect a light bar plate 146 to a roof rack plate 150. One skilled in the art will appreciate that an additional lanyard or safety mechanism may be interconnected such that if the bolts 138 were to become loose, the roof rack 10 would remain interconnected to the light bar 6. Although a traditional nut 142 and bolt 138 configuration is shown in FIG. 18, one skilled in the art will appreciate that a bolt 138 with a larger head that facilitates hand tightening may be used such as shown in FIG. 14 may be used to facilitate use of the convertible roof rack without tools.

Figure 19:
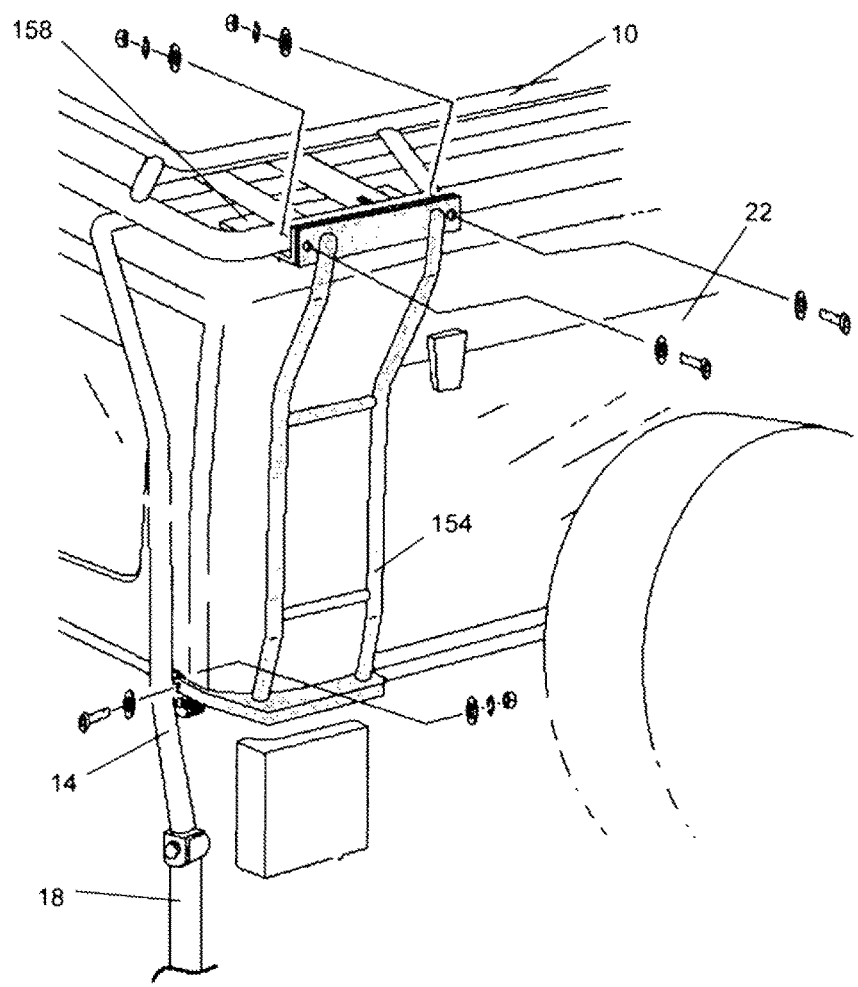
FIG. 19 is a rear perspective view of the roof rack system of one embodiment of the invention with an optional ladder interconnected thereto.
Figure 20:
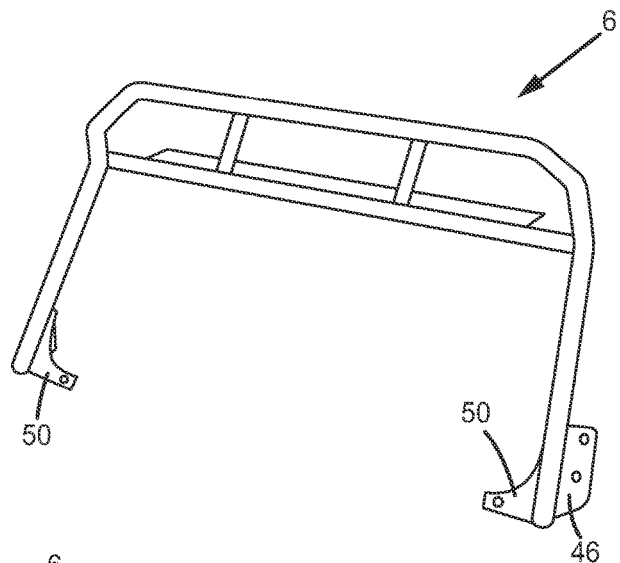
FIG. 20 is a perspective view of a light bar of another embodiment of the present invention.
Figure 21:
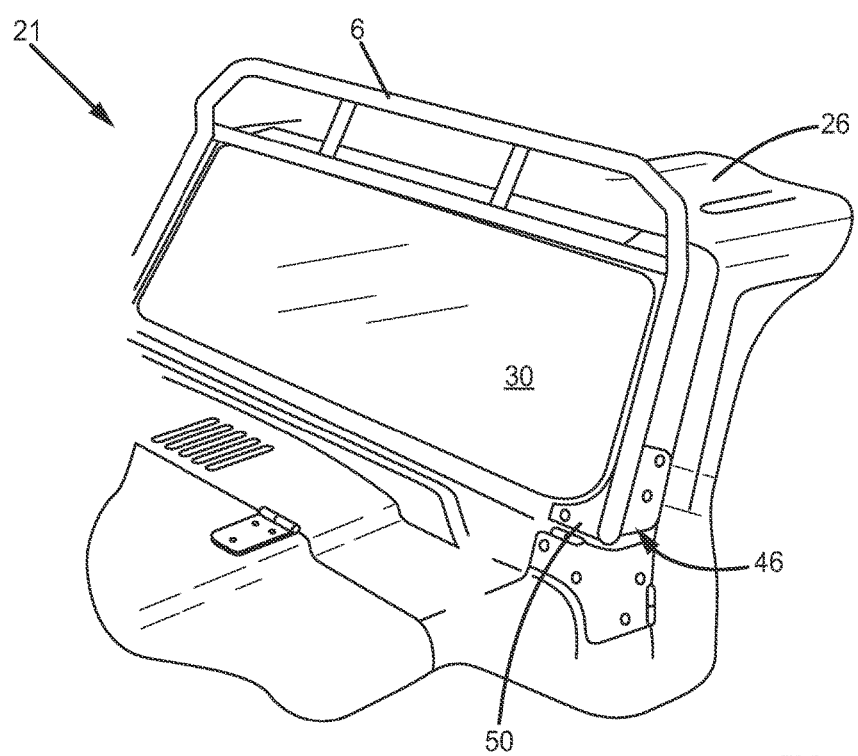
FIG. 21 is a partial perspective view of a vehicle of one embodiment of the present invention with the light bar of FIG. 20 interconnected thereto.
Figure 22:
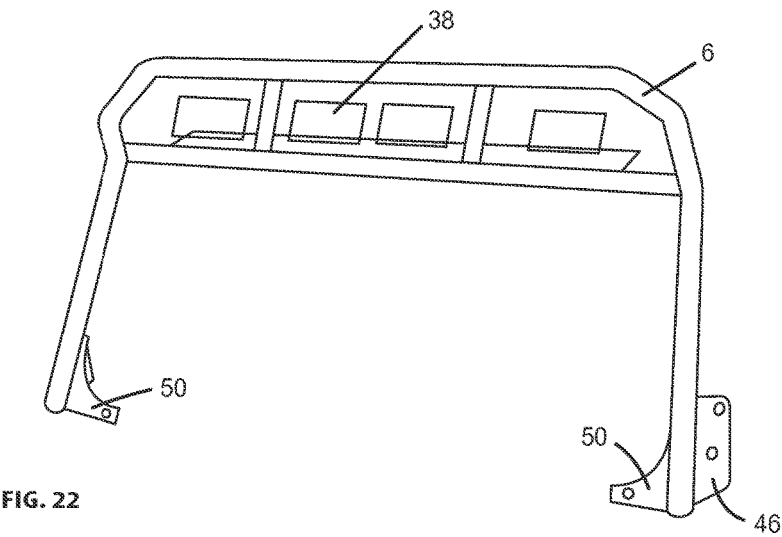
FIG. 22 is a perspective view of the light bar of FIG. 20 with lights of one embodiment interconnected thereto.
Figure 23:
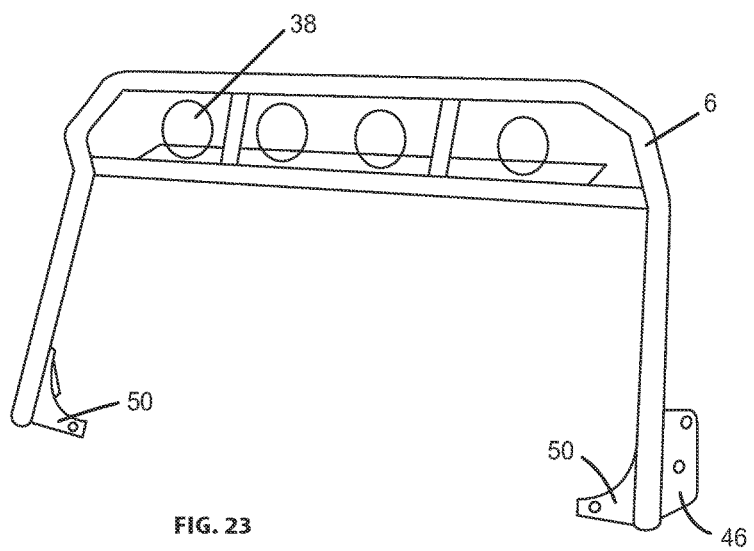
FIG. 23 is a perspective view of the light bar of FIG. 20 with lights of another embodiment interconnected thereto.
Figures 29, 30:
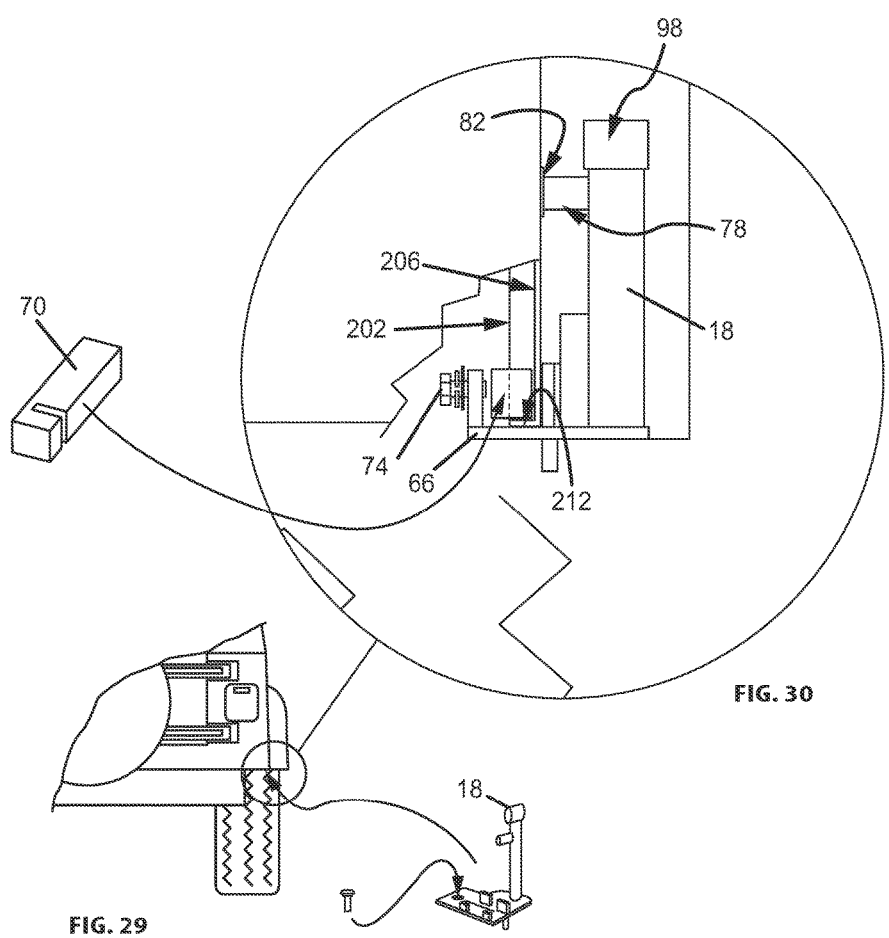
FIG. 29 is a rear elevation view of a vehicle showing the interconnection of the support tower to the vehicle.
FIG. 30 is a detailed view of FIG. 29.

FIG. 19 shows an optional ladder 154 interconnected to the roof rack system 2 of one embodiment of the present invention. The ladder 154 is interconnected to the roof rack 10 by way of a bracket 158 and to the support bar 14 such that the ladder 154 will travel with the roof rack 10 and the support bar 14. That is, as shown, the ladder 154 is interconnected solely to the roof rack 10 and associated support structure such that it moves with the roof rack. Those of skill in the art will appreciate, however, that the ladder 154 may be interconnected to vehicle and the roof rack 10 such that the user must disconnect the ladder 154 from the vehicle and/or the roof rack 10 prior to moving the roof rack 10. In addition, as the ladder 154 further interconnects the roof rack 10 to the support bar 14, enhanced stiffening is provided and sway is reduced. One of skill in the art will appreciate that the ladder 154 may be interconnected on the left side of the vehicle 22, the right side or two ladders may be provided. The contemplated ladder does not interfere with any moving or stationary part of the vehicle such as a swing gate tire carrier, rear tail lights, rear window openings, etc.

In order to accommodate some types of vehicles, a frame extension may be required, which is shown in FIGS. 24-30. That is, in some instances the vehicle is such that the support plate 86 (see FIG. 11) does not easily interface with the vehicle frame and an extension is required. The extension of comprised of a clamp plate 162 and a frame extension plate 166 that are interconnected to the vehicle's rear frame 182. In order to interconnect the frame extension plate 166, a rear bumper end cap 170 is removed from the rear bumper 190 by disengaging a lower nut and washer 174. The clamp plate 162 is then positioned behind the rear frame 182 and secured with carriage bolts 178 to the frame extension plate 166 by nuts and washers 198 threaded onto the carriage bolts 178. The clamp plate 162 is preferably positioned to the rear of the exhaust tail pipe support 186 proximate to the tail pipe 198. The frame extension plate 166 is also interconnected to the bumper bolt 194 with the lower nut and washer 174. In a preferred embodiment, NYLOK® nuts, i.e., locking nuts that include a nylon collar insert, are used to fasten the frame extension plate 166.

The frame extension plate 166 may be adjustably positioned to a desired distance away from the frame 182. In one embodiment, the spacing between the frame 182 and the frame extension plate 166 is 2⅝ inches. Similar to the embodiments described above, the support tower 18 includes a clamp portion 66 that includes a pinch plate 70. The pinch plate 70 is positioned onto an inner body flange 202 such that it rests flush against the inner body sheet metal wall 206 and on a lower edge portion 212. In operation, tightening the screw 74 sandwiches the pinch plate 70 between the inner body sheet metal wall 202 and the clamp portion 66 to hold the support tower 18 in place. In embodiments of the present invention, the screw 74 is associated with lock washers and/or flat washers. To enhance the interconnection of the support tower 18 to the vehicle, a support plate (see FIG. 11) may be interconnected to the frame extension 166 and the support tower.

Figure 31:
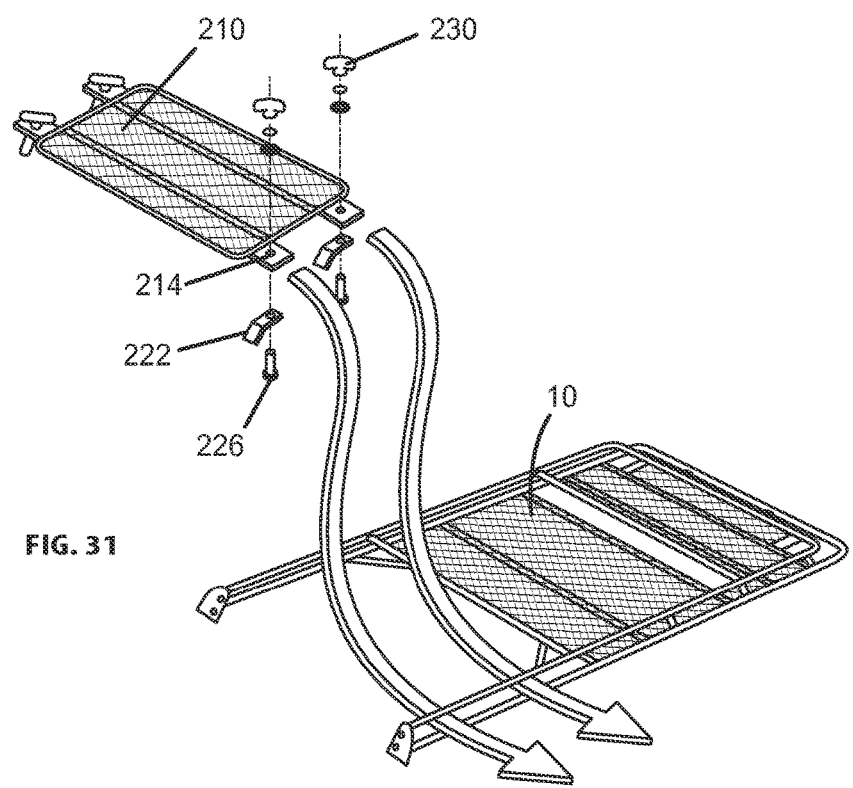
FIG. 31 is a perspective view of a sun roof insert that optionally interconnects to the roof rack.
Figure 32:
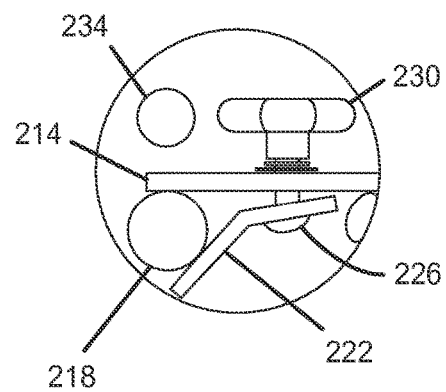
FIG. 32 is a detailed view of FIG. 31 showing the interconnection of the insert to the roof rack.

FIGS. 31 and 32 show a sunroof insert 210 for interconnection to the roof rack 10 adjacent to the location of a vehicle sunroof that provides additional storage space. The sun roof insert 210 of one embodiment of the present invention includes a plurality of ears 214 that engage a lower roof rack tube 218 of the roof rack 10. The ears 214 work in conjunction with a clamp 222 to interconnect the sun roof insert 210 to the roof rack 10. That is, the ears 214 and the clamp 222, with the bottom roof rack tube 218 therebetween, receive a bolt 226 that is hand-tightened by a knob 230 to affix the sunroof insert 210 to the roof rack 10. One of skill in the art will appreciate that other interconnection techniques and methods may be used without departing from the scope of the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. However, it is to be expressly understood that such modifications and alterations are within the scope and spirit of the present invention, as set forth in the following claims.

What is claimed is:

1. A roof rack system comprising:
    a roof rack that is rotatable between at least a first position and a second position, the first position comprising a position adjacent to a roof of a vehicle;
    a support tower that is selectively securable to the vehicle and operable to extend from the vehicle, the support tower comprising a first end with a base plate and a clamp plate, wherein the clamp plate is operable to selectively secure the support tower to the vehicle, and the support tower comprising a second end with a collar;
    a support bar extending between the roof rack and the support tower and comprising a first end fixedly secured to the roof rack and a second end rotatably connected to the collar of the support tower;
    wherein the roof rack and the support bar are rotatable relative to the support tower and wherein the roof rack and the support bar are not rotatable relative to one another; and
    a selectively removable ladder secured to at least one of the roof rack and the support bar, and wherein the ladder comprises a plurality of rungs.

2. The roof rack system of claim 1, wherein the selectively removable ladder is secured to the roof rack and the support bar to enhance stiffening and reduce sway.

3. The roof rack system of claim 1, wherein the selectively removable ladder is connectable to a rear edge of the roof rack.

4. The roof rack system of claim 1, further comprising a sunroof insert selectively interconnected to the roof rack.

5. The roof rack system of claim 1, further comprising an isolator associated with the support tower, and wherein the isolator comprises non-metallic material operable to isolate the vehicle from vibration and abrasion.

6. The roof rack system of claim 1, further comprising:
    a bar interconnected to the vehicle adjacent to a windshield thereof; and
    a second support tower adapted for interconnection to the vehicle, the second support tower comprising a second end with a collar;
    wherein pivot points are associated with the collars of each of the support towers.

7. The roof rack system of claim 6, further comprising an isolator associated with the second support tower, the isolator adapted to engage a portion of the vehicle.

8. The roof rack system of claim 1, further comprising a bolt and at least one washer, and wherein the support bar is rotatably interconnected to the collar of the support tower by the bolt and the at least one washer.

\* \* \* \* \*